United States Patent
St. Jean et al.

(10) Patent No.: US 9,309,338 B2
(45) Date of Patent: *Apr. 12, 2016

(54) HIGH CLARITY LOW HAZE COMPOSITIONS

(71) Applicant: Chevron Phillips Chemical Company LP, The Woodlands, TX (US)

(72) Inventors: Guylaine St. Jean, Bartlesville, OK (US); Elizabeth M. Lanier, Bartlesville, OK (US); J. Todd Lanier, Bartlesville, OK (US); Qing Yang, Bartlesville, OK (US); Brooke A. Gill, Glen Carbon, IL (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,457

(22) Filed: Jun. 8, 2015

(65) Prior Publication Data

US 2015/0337059 A1 Nov. 26, 2015

Related U.S. Application Data

(63) Continuation of application No. 14/284,704, filed on May 22, 2014.

(51) Int. Cl.
*C08F 210/16* (2006.01)
*C08F 210/02* (2006.01)
(Continued)

(52) U.S. Cl.
CPC .............. *C08F 110/02* (2013.01); *B01J 19/24* (2013.01); *B01J 19/2455* (2013.01);
(Continued)

(58) Field of Classification Search
CPC .. C08F 10/02; C08F 2500/05; C08F 2500/06; C08F 2/38; C08F 295/00; C08F 297/083; C08F 210/16; C08F 210/02
See application file for complete search history.

(56) References Cited

U.S. PATENT DOCUMENTS

| 3,248,179 A | 4/1966 | Norwood |
| 4,501,885 A | 2/1985 | Sherk et al. |

(Continued)

FOREIGN PATENT DOCUMENTS

| EP | 1584651 A1 | 10/2005 |
| WO | 2011019563 A1 | 2/2011 |

OTHER PUBLICATIONS

Tate, R. F, et al., "HDPE Blending Technology for Enhanced LDPE Film Properties," ANTEC, May 2000, pp. 1-8 plus 2 cover pages, Equistar, A Lyondell Company.
(Continued)

*Primary Examiner* — Rip A Lee
(74) *Attorney, Agent, or Firm* — Conley Rose, P.C.; Rodney B. Carroll; Cheryl L. Huseman

(57) ABSTRACT

A first embodiment which is a bimodal polymer having a weight fraction of a lower molecular weight (LMW) component ranging from about 0.25 to about 0.45, a weight fraction of a higher molecular weight (HMW) component ranging from about 0.55 to about 0.75 and a density of from about 0.931 g/cc to about 0.955 g/cc which when tested in accordance with ASTM D1003 using a 1 mil test specimen displays a haze characterized by equation: %Haze=2145−2216*Fraction$_{LMW}$−181*a molecular weight distribution of the LMW component (MWD$_{LMW}$)−932*a molecular weight distribution of the HMW component(MWD$_{HMW}$)+27*(Fraction$_{LMW}$*MWD$_{LMW}$)+1019*(Fraction$_{LMW}$*MWD$_{HMW}$)+73*(MWD$_{LMW}$*MWD$_{HMW}$) wherein fraction refers to the weight fraction of the component in the polymer as a whole.

17 Claims, 7 Drawing Sheets

(51) Int. Cl.
*C08F 110/02* (2006.01)
*C08J 5/18* (2006.01)
*B01J 19/24* (2006.01)
C08F 10/02 (2006.01)
C08F 4/659 (2006.01)
C08F 4/6592 (2006.01)

(52) U.S. Cl.
CPC ............ *C08F 210/16* (2013.01); *C08J 5/18* (2013.01); *B01J 2219/24* (2013.01); *C08F 4/65912* (2013.01); *C08F 4/65916* (2013.01); *C08F 4/65925* (2013.01); *C08F 4/65927* (2013.01); *C08F 10/02* (2013.01); *C08J 2323/06* (2013.01); *Y10T 428/139* (2015.01); *Y10T 428/1397* (2015.01)

(56) References Cited

U.S. PATENT DOCUMENTS

| | | | |
|---|---|---|---|
| 4,588,790 A | 5/1986 | Jenkins, III et al. | |
| 5,352,749 A | 10/1994 | DeChellis et al. | |
| 5,436,304 A | 7/1995 | Griffin et al. | |
| 5,455,314 A | 10/1995 | Burns et al. | |
| 5,565,175 A | 10/1996 | Hottovy et al. | |
| 5,575,979 A | 11/1996 | Hanson | |
| 6,239,235 B1 | 5/2001 | Hottovy et al. | |
| 6,262,191 B1 | 7/2001 | Hottovy et al. | |
| 6,833,415 B2 | 12/2004 | Kendrick et al. | |
| 7,148,305 B2* | 12/2006 | Stevens | C08F 10/00 502/152 |
| 7,226,886 B2 | 6/2007 | Jayaratne et al. | |
| 7,312,283 B2 | 12/2007 | Martin et al. | |
| 7,514,504 B2 | 4/2009 | Van Sinoy et al. | |
| 7,625,982 B2* | 12/2009 | Martin | C08F 210/16 138/178 |
| 7,754,840 B2* | 7/2010 | Loveday | C08F 10/00 138/125 |
| 8,222,356 B2 | 7/2012 | Kipke et al. | |
| 9,079,993 B1* | 7/2015 | St. Jean | C08F 210/16 |
| 2002/0107342 A1 | 8/2002 | Mawson et al. | |
| 2008/0188632 A1 | 8/2008 | Razavi | |
| 2012/0277380 A1 | 11/2012 | Karjala et al. | |
| 2013/0165590 A1 | 6/2013 | McLeod et al. | |
| 2014/0128563 A1* | 5/2014 | McDaniel | C08F 210/14 526/348.5 |

OTHER PUBLICATIONS

Wilkes, Garth L., et al., "Optical Haze Properties of Polyethylene Blown Films: Part 1—Surface Versus Bulk Structural Considerations," SPE ANTEC, pp. 1-12, May 2001, Chevron Phillips Chemical Company LP.

Foreign communication from a related counterpart application—International Search Report, PCT/US2015/031975, Feb. 8, 2016, 5 pages.

\* cited by examiner ed States Patent US 9,309,338 B2

HIGH CLARITY LOW HAZE COMPOSITIONS

CROSS REFERENCE TO RELATED APPLICATIONS

This application is a continuation of and claims priority to U.S. patent application Ser. No. 14/284,704 filed on May 22, 2014, and entitled "Novel High Clarity Low Haze Compositions," which is incorporated by reference herein in its entirety.

FIELD

The present disclosure relates to novel polymer compositions and film made from same, more specifically to polyethylene compositions for the manufacture of high clarity, low haze films.

BACKGROUND

Polyolefins are plastic materials useful for making a wide variety of valued products due to their combination of stiffness, ductility, barrier properties, temperature resistance, optical properties, availability, and low cost. In particular, polyethylene (PE) is one of the largest volume polymers consumed in the world. It is a versatile polymer that offers high performance relative to other polymers and alternative materials such as glass, metal or paper. One of the most valued products is plastic films. Plastic films such as PE films are mostly used in packaging applications but they also find utility in the agricultural, medical and engineering fields.

PE films are manufactured in a variety of polymer grades that are usually differentiated by the polymer density such that PE films can be designated for example, low density polyethylene (LDPE), medium density polyethylene (MDPE) and, high density polyethylene (HDPE) wherein each density range has a unique combination of properties making it suitable for a particular application. Generally speaking, films prepared from MDPE and HDPE display poor optical properties in terms of a high degree of haze and low clarity. An ongoing need exists for MDPE and HDPE polymer compositions having improved optical properties.

SUMMARY

Disclosed herein is a bimodal polymer having a weight fraction of a lower molecular weight (LMW) component ranging from about 0.25 to about 0.45, a weight fraction of a higher molecular weight (HMW) component ranging from about 0.55 to about 0.75 and a density of from about 0.931 g/cc to about 0.955 g/cc which when tested in accordance with ASTM D1003 using a 1 mil test specimen displays a haze characterized by equation: % Haze=2145−2216*Fraction$_{LMW}$−181*a molecular weight distribution of the LMW component (MWD$_{LMW}$)−932*a molecular weight distribution of the HMW component(MWD$_{HMW}$)+27*(Fraction$_{LMW}$*MWD$_{LMW}$)+1019*(Fraction$_{LMW}$*MWD$_{HMW}$)+73*(MWD$_{LMW}$*MWD$_{HMW}$) wherein fraction refers to the weight fraction of the component in the polymer as a whole.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
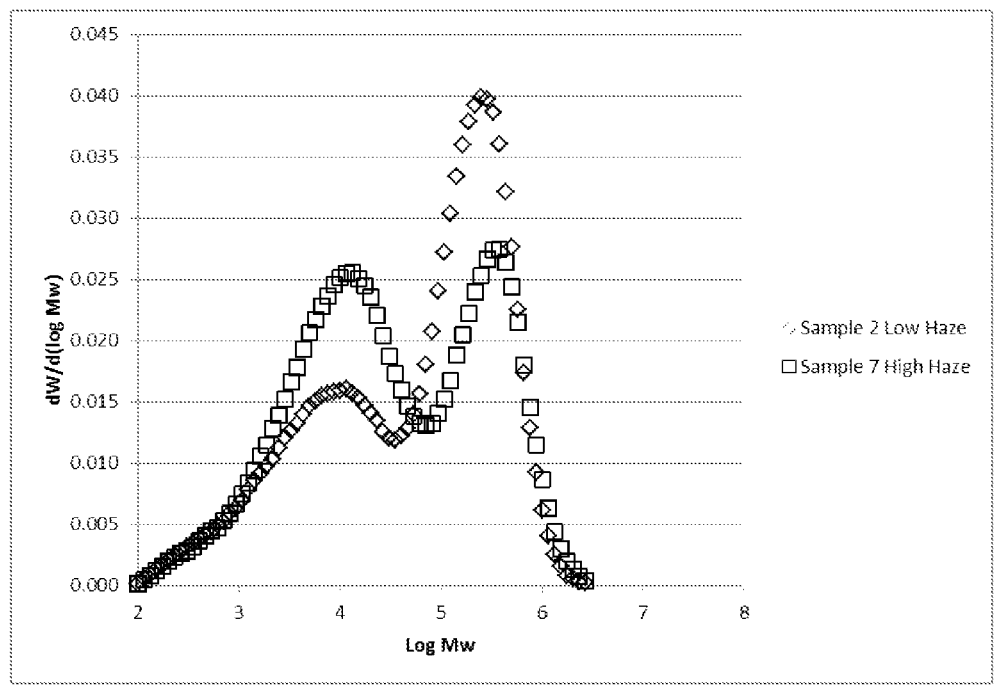
FIG. 1 is a size exclusion chromatograph overlay of samples from example 1.

Disclosed herein are polyethylene (PE) polymers, PE films, and methods of making same. Such methods may comprise preparing a PE polymer and forming the PE polymer into a film. In an aspect, the PE polymer comprises a multimodal PE polymer and the film prepared therefrom may display enhanced optical properties such as increased clarity and reduced haze.

The PE polymers of the present disclosure can be formed using any suitable olefin polymerization method which may be carried out using various types of polymerization reactors. As used herein, "polymerization reactor" includes any polymerization reactor capable of polymerizing olefin monomers to produce homopolymers or copolymers. Such homopolymers and copolymers are referred to as resins or polymers.

The various types of reactors include those that may be referred to as batch, slurry, gas-phase, solution, high pressure, tubular, or autoclave reactors. Gas phase reactors may comprise fluidized bed reactors or staged horizontal reactors. Slurry reactors can comprise vertical or horizontal loops. High pressure reactors may comprise autoclave or tubular reactors. Reactor types can include batch or continuous processes. Continuous processes could use intermittent or continuous product discharge. Processes can also include partial or full direct recycle of un-reacted monomer, un-reacted co-monomer, and/or diluent.

Polymerization reactor systems of the present disclosure can comprise one type of reactor in a system or multiple reactors of the same or different type. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactors. Alternatively, polymerization in multiple reactors can include the manual transfer of polymer from one reactor to subsequent reactors for continued polymerization. Multiple reactor systems can include any combination including, but not limited to, multiple loop reactors, multiple gas reactors, a combination of loop and gas reactors, multiple high pressure reactors, or a combination of high pressure with loop and/or gas reactors. The multiple reactors can be operated in series or in parallel.

According to one aspect of the disclosure, the polymerization reactor system can comprise at least one loop slurry reactor comprising vertical and/or horizontal loops. Monomer, diluent, catalyst and optionally any co-monomer can be continuously fed to a loop reactor where polymerization occurs. Generally, continuous processes can comprise the continuous introduction of a monomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or co-monomer. Various technologies can be used for this separation step including but not limited to, flashing that can include any combination of heat addition and pressure reduction; separation by cyclonic action in either a cyclone or hydrocyclone; or separation by centrifugation.

A suitable slurry polymerization process (also known as the particle form process), is disclosed, for example, in U.S. Pat. Nos. 3,248,179, 4,501,885, 5,565,175, 5,575,979, 6,239,235, 6,262,191, and 6,833,415, each of which is incorporated by reference herein in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor can comprise at least one gas phase reactor. Such systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference herein in its entirety.

According to still another aspect of the disclosure, a high pressure polymerization reactor can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect of the disclosure, the polymerization reactor can comprise a solution polymerization reactor wherein the monomer is contacted with the catalyst composition by suitable stirring or other means. A carrier comprising an inert organic diluent or excess monomer can be employed. If desired, the monomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactors suitable for the present disclosure can further comprise any combination of at least one raw material feed system, at least one feed system for catalyst or catalyst components, and/or at least one polymer recovery system. Suitable reactor systems for the present disclosure can further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure, and the concentrations of various reactants. Polymerization temperature can affect catalyst productivity, polymer molecular weight and molecular weight distribution. Suitable polymerization temperature can be any temperature below the de-polymerization temperature according to the Gibbs free energy equation. Typically, this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200 to about 500 psig. High pressure polymerization in tubular or autoclave reactors is generally run at about 20,000 to about 75,000 psig. Polymerization reactors can also be operated in a supercritical region occurring at generally higher temperatures and pressures. Operation above the critical point of a pressure/temperature diagram (supercritical phase) can offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching and rheological measurements.

The concentrations of monomer, hydrogen, modifiers, and electron donors can be utilized in producing these resin properties. Co-monomer is used to control product density. Hydrogen can be used to control product molecular weight. Modifiers can be used to control product properties and electron donors affect stereoregularity. In addition, the concentration of poisons is minimized because poisons impact the reactions and product properties. In an embodiment, hydrogen is added to the reactor during polymerization. Alternatively, hydrogen is not added to the reactor during polymerization.

The polymer or resin can be formed into various articles, including, but not limited to pipes, bottles, toys, containers, utensils, film products, drums, tanks, membranes, and liners. Various processes can be used to form these articles, including, but not limited to, film blowing and cast film, blow molding, extrusion molding, rotational molding, injection molding, fiber spinning, thermoforming, cast molding, and the like. After polymerization, additives and modifiers can be added to the polymer to provide better processing during manufacturing and for desired properties in the end product.

Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

The PE polymer can include other suitable additives. Such additives can be used singularly or in combination and can be included in the polymer composition before, during or after preparation of the PE polymer as described herein. Such additives can be added via known techniques, for example during an extrusion or compounding step such as during pelletization or subsequent processing into an end use article. Herein the disclosure will refer to a PE polymer although a polymer composition comprising the PE polymer and one or more additives is also contemplated.

Any catalyst composition capable of producing a PE polymer of the type disclosed herein can be employed in the production of the polymer. For example, a catalyst composition for the production of a PE polymer of the type disclosed herein can include at least two metallocenes that are selected such that the polymers produced therefrom have two distinctly different molecular weights. The first metallocene can be a tightly-bridged metallocene containing a substituent that includes a terminal olefin. The second metallocene is generally not bridged and is more responsive to chain termination reagents, such as hydrogen, than the first metallocene. The metallocenes can be combined with an activator, an aluminum alkyl compound, an olefin monomer, and an olefin comonomer to produce the desired polyolefin. The activity and the productivity of the catalyst can be relatively high. As used herein, the activity refers to the grams of polymer produced per gram of solid catalyst charged per hour, and the productivity refers to the grams of polymer produced per gram of solid catalyst charged. Such catalysts are disclosed for example in U.S. Pat. Nos. 7,312,283 and 7,226,886 each of which is incorporated herein by reference in its entirety.

In an embodiment, a catalyst composition comprises a first metallocene compound, a second metallocene compound, an activator and optionally an organoaluminum compound. The first metallocene compound can be characterized by the general formula:

$$(X^1R^1)(X^2R^2_2)(X^3)(X^4)M^1;$$

wherein $(X^1)$ is cyclopentadienyl, indenyl, or fluorenyl, $(X^2)$ is fluorenyl, and $(X^1)$ and $(X^2)$ are connected by a disubstituted bridging group comprising one atom bonded to both $(X^1)$ and $(X^2)$, wherein the atom is carbon or silicon. A first substituent of the disubstituted bridging group is an aromatic or aliphatic group having from 1 to about 20 carbon atoms. A second substituent of the disubstituted bridging group can be an aromatic or aliphatic group having from 1 to about 20 carbon atoms, or the second substituent of the disubstituted bridging group is an unsaturated aliphatic group having from 3 to about 10 carbon atoms. $R^1$ is H, or an unsaturated aliphatic group having from 3 to about 10 carbon atoms. $R^2$ is H, an alkyl group having from 1 to about 12 carbon atoms, or an aryl group; $(X^3)$ and $(X^4)$ are independently an aliphatic group, an aromatic group, a cyclic group, a combination of aliphatic and cyclic groups, or a substituted derivative thereof, having from 1 to about 20 carbon atoms, or a halide; and $M^1$ is Zr or Hf. The first substituent of the disubstituted bridging group can be a phenyl group. The second substituent of the disubstituted bridging group can be a phenyl group, an alkyl group, a butenyl group, a pentenyl group, or a hexenyl group.

The second metallocene compound can be characterized by the general formula:

$$(X^5)(X^6)(X^7)(X^8)M^2;$$

wherein $(X^5)$ and $(X^6)$ are independently a cyclopentadienyl, indenyl, substituted cyclopentadienyl or a substituted indenyl, each substituent on $(X^5)$ and $(X^6)$ is independently selected from a linear or branched alkyl group, or a linear or branched alkenyl group, wherein the alkyl group or alkenyl group is unsubstituted or substituted, any substituent on $(X^5)$ and $(X^6)$ having from 1 to about 20 carbon atoms; $(X^7)$ and $(X^8)$ are independently an aliphatic group, an aromatic group, a cyclic group, a combination of aliphatic and cyclic groups, or a substituted derivative thereof, having from 1 to about 20 carbon atoms; or a halide, and $M^2$ is Zr or Hf.

In an embodiment of the present disclosure, the ratio of the first metallocene compound to the second metallocene compound can be from about 1:10 to about 10:1. According to other aspects of the present disclosure, the ratio of the first metallocene compound to the second metallocene compound can be from about 1:5 to about 5:1. According to yet other aspects of the present disclosure, the ratio of the first metallocene compound to the second metallocene compound can be from about 1:2 to about 2:1.

In an embodiment of the present disclosure, the activator can be a solid oxide activator-support, a chemically treated solid oxide, a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, an aluminoxane, a supported aluminoxane, an ionizing ionic compound, an organoboron compound, or any combination thereof. The terms "chemically-treated solid oxide", "solid oxide activator-support", "acidic activator-support", "activator-support", "treated solid oxide compound", and the like are used herein to indicate a solid, inorganic oxide of relatively high porosity, which exhibits Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide compound comprises the calcined contact product of at least one solid oxide compound with at least one electron-withdrawing anion source compound. Typically, the chemically-treated solid oxide comprises at least one ionizing, acidic solid oxide compound. The terms "support" and "activator-support" are not used to imply these components are inert, and such components should not be construed as an inert component of the catalyst composition.

The organoaluminum compound used with the present disclosure can have the formula:

$$(R^3)_3Al;$$

in which $(R^3)$ is an aliphatic group having from 2 to about 6 carbon atoms. In some instances, $(R^3)$ is ethyl, propyl, butyl, hexyl, or isobutyl.

In an embodiment, the catalysts are chosen from compounds like those represented by the chemical structures A and B with sulfated alumina as the activator-support and with tri-isobutylaluminum (TIBA) as the co-catalyst.

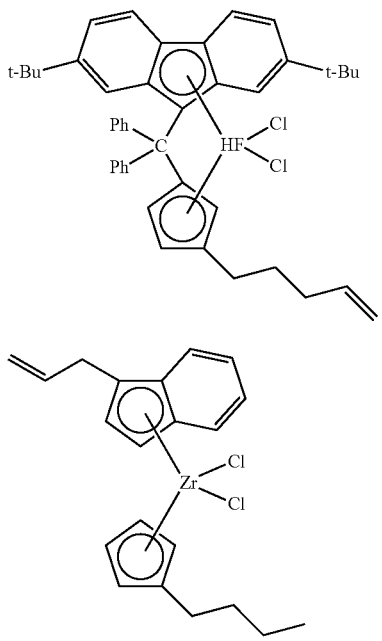

The PE polymer and/or individual components of the PE polymer can comprise a homopolymer, a copolymer, or blends thereof. In an embodiment, the PE polymer is a polymer of ethylene with one or more comonomers such as alpha olefins. Examples of suitable comonomers include without limitation unsaturated hydrocarbons having from 3 to 20 carbon atoms such as propylene, 1-butene, 1-pentene, 1-hexene, 3-methyl-1-butene, 4-methyl-1-pentene, 1-heptene, 1-octene, 1-nonene, 1-decene, and mixtures thereof.

In an embodiment, the PE polymer is a multimodal resin. Herein, the "modality" of a polymer resin refers to the form of its molecular weight distribution curve, i.e. the appearance of a graph of the polymer weight fraction, frequency, or number as a function of its molecular weight. The polymer weight fraction refers to the weight fraction of molecules of a given size. A polymer resin can have two or more components that may be distinguishable from one another, for example based upon their individual composition and/or molecular weight distribution. A molecular weight distribution curve may be prepared for each individual component of the polymer resin.

The molecular weight distribution curves for the individual components may be superimposed onto a common chart to form the weight distribution curve for the polymer resin as a whole. Upon such superimposition, the resultant curve for the polymer resin as a whole may be multimodal or show n distinct peaks corresponding to n polymer components of differing molecular weight distributions. For example, a polymer having a molecular weight distribution curve showing a single peak may be referred to as a unimodal polymer, a polymer having a curve showing two distinct peaks may be referred to as a bimodal polymer, a polymer having a curve showing three distinct peaks may be referred to as a trimodal polymer, etc. Polymers having molecular weight distribution curves showing more than one peak may be collectively referred to as multimodal polymers or resins. Furthermore, the distinct peaks may correspond to components exhibiting distinct characteristics. For example, a bimodal polymer resin may show two distinct peaks corresponding to two individual components of differing molecular weights.

In an embodiment, the PE polymer is a bimodal PE resin. In such embodiments, the PE polymer comprises a higher molecular weight (HMW) component and a lower molecular weight (LMW) component. In such embodiments, the weight fraction of LMW component in the PE polymer may range from about 0.25 to about 0.45, alternatively from about 0.27 to about 0.40, or alternatively from about 0.28 to about 0.39 while the weight fraction of the HMW component in the PE polymer may range from about 0.55 to about 0.75, alternatively from about 0.60 to about 0.73, or alternatively from about 0.61 to about 0.72.

The PE polymers disclosed herein may have a variety of properties and parameters described below either singularly or in combination. Any suitable methodology may be employed for determination of these properties and parameters.

In an embodiment, the PE polymer as a whole may have a weight average molecular weight ($M_w$) ranging from about 125,000 g/mol to about 225,000 g/mol, alternatively from about 130,000 g/mol to about 210,000 g/mol, or alternatively from about 150,000 g/mol to about 200,000 g/mol. The $M_w$ is defined by Equation 1:

$$\overline{M}_w = \frac{\Sigma_i N_i M_i^2}{\Sigma_i N_i M_i} \quad (1)$$

where $N_i$ is the number of molecules of molecular weight $M_i$. All molecular weight averages are expressed in gram per mole (g/mol).

The molecular weight distribution (MWD) of the PE polymer may be characterized by determining the ratio of the $M_w$ to the number average molecular weight ($M_n$), which is also referred to as the polydispersity index (PDI) or more simply as polydispersity. The PE polymers of this disclosure as a whole may display a MWD of from about 20 to about 40, alternatively from about 25 to about 37, or alternatively from about 30 to about 35. In an embodiment, the LMW component of the PE polymer is characterized by a MWD of from about 4.5 to about 10, alternatively from about 4.7 to about 9, or alternatively from about 5 to about 8.5. In an embodiment, the HMW component of the PE polymer is characterized by a MWD of from about 2 to about 4, alternatively from about 2.2 to about 3.2, or alternatively from about 2.3 to about 3.

The PE polymers of this disclosure may have a melt index under a force of 5 kg (I5) of from about 0.10 dg/min. to about 0.90 dg/min., alternatively from about 0.5 dg/min. to about 0.85 dg/min., or alternatively from about 0.55 dg/min. to about 0.80 dg/min.

The PE polymers of this disclosure may have a melt index under a force of 10 kg (I10) of from about 0.5 dg/min. to about 4 dg/min., alternatively from about 1 dg/min. to about 3 dg/min., or alternatively from about 1.5 dg/min. to about 2.5 dg/min. The melt index (MI I5, I10) represents the rate of flow of a molten resin through an orifice of 0.0825 inch diameter when subjected to the indicated force at 190° C. as determined in accordance with ASTM D1238.

The PE polymers of this disclosure may have a high load melt index (HLMI) of from about 5 dg/min to about 15 dg/min, alternatively less than about 15 dg/min., alternatively less than about 12 dg/min., or alternatively less than about 10 dg/min. The HLMI represents the rate of flow of a molten resin through an orifice of 0.0825 inch diameter when subjected to a force of 21.6 kg at 190° C. as determined in accordance with ASTM D1238.

The PE polymers of this disclosure may be further characterized as having a density of from about 0.931 g/cc to about 0.955 g/cc, alternatively greater than about 0.930 g/cc, alternatively greater than about 0.935 g/cc, or alternatively greater than about 0.940 g/cc. The density refers to the mass per unit volume of polymer and may be determined in accordance with ASTM D1505.

In an embodiment, a PE polymer of this disclosure is fabricated into a film. The films of this disclosure may be produced using any suitable methodology. In an embodiment, the polymeric compositions are formed into films through a blown film process. In a blown film process, plastic melt is extruded through an annular slit die, usually vertically, to form a thin walled tube. Air is introduced via a hole in the center of the die to blow up the tube like a balloon. Mounted on top of the die, a high-speed air ring blows onto the hot film to cool it. The tube of film then continues upwards, continually cooling, until it passes through nip rolls where the tube is flattened to create what is known as a lay-flat tube of film. This lay-flat or collapsed tube is then taken back down the extrusion tower via more rollers. On higher output lines, the air inside the bubble is also exchanged. This is known as Internal Bubble Cooling (IBC).

The lay-flat film is then either kept as such or the edges of the lay-flat are slit off to produce two flat film sheets and wound up onto reels. Typically, the expansion ratio between die and blown tube of film would be 1.5 to 4 times the die diameter. The films are extruded using "HDPE film" or "high-stalk extrusion" conditions with a neck height (freeze line height) to die diameter ratio from about 6:1 to 10:1. The drawdown between the melt wall thickness and the cooled film thickness occurs in both radial and longitudinal directions and is easily controlled by changing the volume of air inside the bubble and by altering the haul off speed. The films formed from PE polymers of this disclosure may be of any thickness desired by the user. Alternatively, the PE polymers of this disclosure may be formed into films having a thickness of from about 0.1 mils (2.54 μm) to about 2 mils (50.8 μm), alternatively less than about 2 mils (50.8 μm), alternatively less than about 1.5 mils (38.1 μm), or alternatively less than about 1 mil (25.4 μm).

Films formed from PE polymers of this disclosure may be characterized by a 1% secant modulus in the transverse direction (TD) of from about 100,000 psi (690 MPa) to about 300,000 psi (2068 MPa), alternatively greater than about 100,000 psi (690 MPa), alternatively greater than about 120,000 psi (825 MPa), or alternatively greater than about 150,000 psi (1030 MPa) as determined in accordance with ASTM D882, using a test specimen having a 1.0 mil thickness. In an embodiment, the films formed from PE polymers of this disclosure may be characterized by a 1% secant modulus in the machine direction (MD) of from about 90,000 psi (620 MPa) to about 160,000 psi (1103 MPa), alternatively greater than about 95,000 psi (655 MPa), alternatively greater than about 100,000 psi (690 MPa), or alternatively greater than about 120,000 psi (825 MPa) as determined in accordance with ASTM D882, using a test specimen having a 1.0 mil thickness.

Films formed from PE polymers of this disclosure may be characterized by a 2% secant modulus in the TD of from about 80,000 psi (551 MPa) to about 200,000 psi (1379 MPa), alternatively greater than about 85,000 psi (585 MPa), alternatively greater than about 100,000 psi (690 MPa), or alternatively greater than about 140,000 psi (965 MPa) as determined in accordance with ASTM D882, using a test specimen having a 1.0 mil thickness. In an embodiment, the films formed from PE polymers of this disclosure may be characterized by a 2% secant modulus in the MD of from about 75,000 psi (515 MPa) to about 125,000 psi (862 MPa), alternatively greater than about 75,000 psi (515 MPa), alternatively greater than about 85,000 psi (585 MPa), or alternatively greater than about 100,000 psi (690 MPa) as determined in accordance with ASTM D882, using a test specimen having a 1.0 mil thickness.

The secant modulus is a measure of the rigidity or stiffness of a material. It is basically the applied tensile stress, based on the force and cross-sectional area, divided by the observed strain at that stress level. It is generally constant before the material approaches the point at which permanent deformation will begin to occur.

Films formed from PE polymers of this disclosure may be characterized by a Young's modulus in the TD of from about 110,000 psi (755 MPa) to about 290,000 psi (1999 MPa), alternatively greater than about 110,000 psi (755 MPa), alternatively greater than about 135,000 psi (930 MPa), or alternatively greater than about 150,000 psi (1030 MPa) as determined in accordance with ASTM D882, using a test specimen having a 1.0 mil thickness. In an embodiment, the films formed from PE polymers of this disclosure may be characterized by a Young modulus in the MD of from about 100,000 psi (690 MPa) to about 180,000 psi (1241 MPa), alternatively greater than about 100,000 psi (690 MPa), alternatively greater than about 125,000 psi (860 MPa) or alternatively greater than about 140,000 psi (965 MPa) as determined in accordance with ASTM D882, using a test specimen having a 1.0 mil thickness. Young's modulus, also referred to as modulus of elasticity, is a measure of the stiffness of a given material.

In an aspect, films formed from PE polymers of this disclosure have a dart drop strength, also termed a dart impact strength, ranging from about 100 g to about 500 g, alternatively greater than about 100 g, alternatively greater than about 200 g, or alternatively greater than about 300 g as measured in accordance with ASTM D1709 Method A using a test specimen having a 1 mil thickness. The dart drop strength refers to the weight required to cause 50% of tested films to fail by impact from a falling dart under specified test conditions. Specifically, one method employs the use of a dart having a 38 mm (1.5 in) head diameter dropped from a height of 0.66 m (26. in).

In an embodiment, films formed from PE polymers of this disclosure have an Elmendorf tear strength in the MD ranging from about 40 g to about 150 g, alternatively greater than about 40 g, alternatively greater than about 50 g, or alternatively greater than about 75 g. In an embodiment, films formed from PE polymers of this disclosure have an Elmendorf tear strength in the TD of from about 500 g to about 1200 g, alternatively greater than about 500 g, alternatively greater than about 600 g, or alternatively greater than about 700 g. as measured in accordance with ASTM D1922 using a test specimen having a 1.0 mil thickness. The Elmendorf tear strength refers to the average force required to propagate tearing through a specified length of plastic film or nonrigid sheeting on an Elmendorf-type tear tester. Specifically, test specimens having a pre-cut slit are contacted with a knife-tipped pendulum. The average force required to propagate tearing is calculated from the pendulum energy lost while tearing the test specimen. The tear may be propagated either in the MD or TD.

In an embodiment, the films formed from the PE polymers of this disclosure have a Spencer impact of from about 0.5 J to about 1.8 J, alternatively greater than about 0.5 J, alternatively greater than about 0.75 J, or alternatively greater than about 1.0 J as measured in accordance with ASTM D3420 using a test specimen having a 1 mil thickness. Spencer impact measures the energy necessary to burst and penetrate the center of a specimen, mounted between two rings with a 3.5 inch diameter. The following equation, Equation 2, may be used to obtain an impact value in joules:

$$E = RC/100 \qquad (2)$$

where E is the energy to rupture, Joules, C is the apparatus capacity and, R is the scale reading on a 0 to 100 scale.

In an embodiment, films formed from the PE polymers of this disclosure are characterized by a TD yield strength ranging from about 3500 psi (24 MPa) to about 6500 psi (45 MPa), alternatively greater than about 3500 psi (24 MPa), alternatively greater than about 4000 psi (27 MPa), or alternatively greater than about 4500 psi (30 MPa). In an embodiment, films formed from the PE polymers of this disclosure are characterized by a MD yield strength ranging from about 2500 psi (17 MPa) to about 4500 psi (31 MPa), alternatively greater than about 2500 psi (17 MPa), alternatively greater than about 3000 psi (20 MPa), or alternatively greater than about 3100 psi (21 MPa).

In an embodiment, films formed from the PE polymers of this disclosure are characterized by a TD break strength ranging from about 8000 psi (57 MPa) to about 10000 psi (69 MPa), alternatively greater than about 8300 psi (57 MPa), alternatively greater than about 8500 psi (58 MPa), or alternatively greater than about 9000 psi (62 MPa). In an embodiment, films formed from the PE polymers of this disclosure are characterized by a MD break strength ranging from about 9,000 psi (60 MPa) to about 12,000 psi (83 MPa), alternatively greater than about 9000 psi (60 MPa), alternatively greater than about 10,000 psi (69 MPa), or alternatively greater than about 11,000 psi (75 MPa). In an embodiment, films formed from the PE polymers of this disclosure are characterized by a TD break strain ranging from about 500% to about 700%, alternatively greater than about 500%, alternatively greater than about 525%, or alternatively greater than about 550%. In an embodiment, films formed from the PE polymers of this disclosure are characterized by a MD break strain ranging from about 350% to about 450%, alternatively greater than 350%, alternatively greater than about 400%, or alternatively greater than about 440%.

The yield strength refers to the stress a material can withstand without permanent deformation of the material while the yield strain refers to amount of deformation elongation that occurs without permanent deformation of the material. The break strength refers to the tensile stress corresponding to the point of rupture while the break strain refers to the tensile elongation in the indicated direction corresponding to the point of rupture. The yield strength, yield strain, break strength, and break strain may be determined in accordance with ASTM D882.

In an embodiment, films formed from the PE polymers of this disclosure are characterized by a haze of from about 5% to about 80%, alternatively less than about 80%, alternatively less than about 40%, or less than about 20%. Haze is the cloudy appearance of a material caused by light scattered from within the material or from its surface. The haze of a material can be determined in accordance with ASTM D1003. In an embodiment the haze of a film formed from the PE polymers of this disclosure are characterized by Equation (3):

$$\% \text{ Haze} = 2145 - 2216 * \text{Fraction}_{LMW} - 181 * (\text{MWD}_{LMW}) - 932 * (\text{MWD}_{HMW}) + 27 * (\text{Fraction}_{LMW} * \text{MWD}_{LMW}) + 1019 * (\text{Fraction}_{LMW} * \text{MWD}_{HMW}) + 73 * (\text{MWD}_{LMW} * \text{MWD}_{HMW}) \qquad \text{[Equation 3]}$$

In an embodiment a film formed from a PE polymer of this disclosure may display a haze of less than about 40%, alternatively less than about 20% and is further characterized by a weight fraction of the LMW component ranging from about 0.25 to about 0.45, a MWD of the LMW component of from about 5.1 to about 8.3, a MWD of the HMW component ranging from about 2.3 to about 2.6. In an embodiment, films having a haze of greater than about 70% and further characterized by a weight fraction of the LMW component ranging from about 0.50 to about 0.70, a MWD of the LMW component ranging from about 4.4 to about 5.9, and a MWD of the HMW component ranging from about 2 to about 2.3 are excluded from this disclosure.

In an embodiment, films formed from PE polymers of this disclosure are characterized by a clarity of from about 40% to about 90%, alternatively greater than about 40%, alternatively greater than about 60%, or alternatively greater than about 80% as determined in accordance with ASTM D1746. In an embodiment, the clarity of a film formed from the PE polymers of this disclosure are characterized by Equation (4):

$$\% \text{ Clarity} = 1934 * \text{Fraction}_{LMW} + 139 * (\text{MWD}_{LMW}) + 709 * (\text{MWD}_{HMW}) - 60 * (\text{Fraction}_{LMW} * \text{MWD}_{LMW}) - 819 * (\text{Fraction}_{LMW} * \text{MWD}_{HMW}) - 47 * (\text{MWD}_{LMW} * \text{MWD}_{HMW}) - 1632 \qquad \text{[Equation 4]}$$

Herein haze is defined as the percent of transmitted light that is scattered more than 2.5° from the direction of the incident beam while clarity refers to the cloudiness of specimen prepared from the polymeric composition.

In an embodiment, the films produced from PE polymers of the type described herein have a gloss 60° of from about 20 to about 60, or alternatively greater than about 20, alternatively greater than about 25, or alternatively greater than about 50 as determined in accordance with ASTM D2457. The gloss of a material is based on the interaction of light with the surface of a material, more specifically the ability of the surface to reflect light in a specular direction. Gloss is measured by measuring the degree of gloss as a function of the angle of the incident light, for example at 60° incident angle (also known as "gloss 60°").

In an embodiment, films formed from the PE polymers of this disclosure have an oxygen transmission rate (OTR) of from about 215 cc/100 in$^2$/day to about 140 cc/100 in$^2$/day, alternatively less than about 215 cc/100 in$^2$/day, alternatively less than about 175 cc/100 in$^2$/day, or alternatively less than about 150 cc/100 in$^2$ for a 1-mil film as measured in accordance with ASTM D3985. OTR is the measurement of the amount of oxygen gas that passes through a film over a given period. Testing may be conducted under a range of relative humidity conditions at a range of temperatures. Typically, one side of the film is exposed to the oxygen permeant. As it solubilizes into the film and permeates through the sample material, nitrogen sweeps the opposite side of the film and transports the transmitted oxygen molecules to a coulometric sensor. This value is reported as a transmission rate. When this rate is multiplied by the average thickness of the material, the results are considered a permeability rate.

In an embodiment, the films formed from the PE polymers of this disclosure have an moisture vapor transmission rate (MVTR) of from about 0.6 g-mil/100 in$^2$/day to about 0.35 g-mil/100 in$^2$/day, alternatively less than about 0.60 g-mil/100 in$^2$/day; alternatively less than about 0.50 g-mil/100 in$^2$/day, or alternatively less than about 0.45 g-mil/100 in$^2$/day for a 1-mil film as measured in accordance with ASTM F 1249 at 100° F. and 90% relative humidity (RH). The MVTR measures passage of gaseous H$_2$O through a barrier. The MVTR may also be referred to as the water vapor transmission rate (WVTR). Typically, the MVTR is measured in a special chamber, divided vertically by the substrate/barrier material. A dry atmosphere is in one chamber, and a moist atmosphere is in the other. A 24-hour test is run to see how much moisture passes through the substrate/barrier from the "wet" chamber to the "dry" chamber under conditions which can specify any one of five combinations of temperature and humidity in the "wet" chamber.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

Fifteen experimental resins of the type disclosed herein, designated 1-15, were prepared. The polymerization conditions utilized to prepare each resin sample are presented in Table 1.

TABLE 1

|  | Sample# | | | | | | | |
|---|---|---|---|---|---|---|---|---|
|  | 1 | 2 | 3 | 4 | 5 | 6 | 7 | 8 |
| Activator-Support | Sulfated Alumina | Sulfated Alumina | Sulfated Alumina | Sulfated Alumina | Sulfated Alumina | Sulfated Alumina | Sulfated Alumina | Sulfated Alumina |
| Feeder size (cc) | 0.9 | | | 0.35 | | 0.35 | | |
| Activator-Support to reactor (rounds/hr) | 37 | 33 | 34 | 34 | 34 | 33 | 34 | 33 |
| Metallocene A to reactor based on i-C4 (ppm) | 1.36 | 1.02 | 1.24 | 1.19 | 0.95 | 1.26 | 1.03 | 1.22 |
| Metallocene B to reactor based on i-C4 (ppm) | 1.44 | 1.28 | 1.31 | 1.26 | 0.86 | 1.33 | 1.29 | 1.11 |
| Autoclave residence time (Min) | 29 | 31 | 30 | 31 | 31 | 30 | 30 | 30 |
| Tiba to Reactor based on i-C4 (ppm) | 83.7 | 75.8 | 72.2 | 73.7 | 68.8 | 77.9 | 76.8 | 72.5 |
| Rx Temp (° F.) | 201.0 | 201.1 | 192.1 | 196.7 | 197.1 | 191.8 | 192.0 | 197.2 |
| Ethylene (mol %) | 16.3 | 13.4 | 13.4 | 16.1 | 12.6 | 15.8 | 14.0 | 14.0 |
| 1-hexene (mol %) | 0.8 | 0.5 | 0.4 | 0.7 | 0.6 | 0.8 | 0.7 | 0.7 |
| $H_2$ feed rate(lb/hr) | 0.0254 | 0.0258 | 0.0261 | 0.0259 | 0.0155 | 0.0254 | 0.0259 | 0.0154 |
| Ethylene feed rate (lb/hr) | 50.4 | 51.4 | 50.7 | 51.1 | 51.3 | 51.4 | 50.9 | 51.3 |
| 1-Hexene feed rate (lb/hr) | 1.7 | 1.7 | 0.3 | 1.7 | 1.6 | 1.6 | 1.8 | 1.7 |
| Total i-C4 flow rate (lb/hr) | 52.4 | 52.3 | 52.8 | 52.1 | 52.3 | 52.0 | 52.3 | 52.3 |
| Solids concentration (wt %) | 43.1 | 44.3 | 44.1 | 43.7 | 45.5 | 44.0 | 44.0 | 44.7 |
| Polymer production (lb/hr) | 46.0 | 47.7 | 46.8 | 46.8 | 48.8 | 47.1 | 47.2 | 48.0 |
| Density (pellet) (g/cc) | 0.9419 | 0.9409 | 0.9545 | 0.9464 | 0.9431 | 0.9495 | 0.9491 | 0.9448 |
| HLMI (pellet) | 6.43 | 5.25 | 7.57 | 12.99 | 3.35 | 12.09 | 22.03 | 5.39 |

|  | Sample# | | | | | | |
|---|---|---|---|---|---|---|---|
|  | 9 | 10 | 11 | 12 | 13 | 14 | 15 |
| Activator-Support | Sulfated Alumina | Sulfated Alumina | Sulfated Alumina | Sulfated Alumina | Sulfated Alumina | Sulfated Alumina | Sulfated Alumina |
| Feeder size (cc) | 0.9 | 0.9 | | 0.9 | 0.9 | 0.9 | 0.9 |
| Activator-Support to reactor (rounds/hr) | 42 | 33 | 34 | 37 | 34 | 34 | 34 |
| Metallocene A to reactor based on i-C4 (ppm) | 1.35 | 1.26 | 0.85 | 1.21 | 1.17 | 1.20 | 1.23 |
| Metallocene B to reactor based on i-C4 (ppm) | 1.42 | 1.32 | 1.07 | 1.27 | 1.23 | 1.26 | 1.29 |
| Autoclave residence time (Min) | 30 | 30 | 32 | 31 | 30 | 30 | 31 |
| Tiba to Reactor based on i-C4 (ppm) | 82.1 | 74.5 | 68.2 | 82.4 | 72.2 | 75.9 | 75.4 |
| Rx Temp (° F.) | 200.8 | 196.5 | 197.2 | 196.8 | 197.1 | 197.1 | 191.8 |
| Ethylene (mol %) | 15.2 | 13.9 | 12.5 | 14.1 | 14.9 | 14.9 | 14.5 |
| 1-hexene (mol %) | 0.7 | 0.7 | 0.7 | 0.7 | 0.3 | 0.3 | 0.8 |
| $H_2$ feed rate(lb/hr) | 0.0154 | 0.0155 | 0.0154 | 0.0155 | 0.0157 | 0.0157 | 0.0155 |
| Ethylene feed rate (lb/hr) | 51.0 | 51.4 | 52.3 | 51.1 | 43.4 | 51.1 | 51.1 |
| 1-Hexene feed rate (lb/hr) | 1.7 | 1.6 | 1.6 | 1.7 | 0.3 | 0.4 | 1.6 |
| Total i-C4 flow rate (lb/hr) | 52.3 | 52.0 | 52.2 | 52.3 | 53.2 | 53.1 | 52.0 |
| Solids concentration (wt %) | 43.8 | 44.3 | 45.3 | 44.3 | 39.6 | 43.8 | 44.3 |
| Polymer production (lb/hr) | 47.0 | 47.4 | 49.0 | 47.5 | 39.0 | 46.7 | 47.3 |
| Density (pellet) (g/cc) | 0.9453 | 0.9482 | 0.9479 | 0.9481 | 0.9493 | 0.9579 | 0.9513 |
| HLMI (pellet) | 5.42 | 11.3 | 11.8 | 10.71 | 6.36 | 5.95 | 41.45 |

The resin $M_w$, $M_w/M_n$, Melt index (I5 and I10), HLMI, MFR and density of these resins are presented in Table 2.

TABLE 2

| Sample ID | Mw (kg/mol) | Mw/Mn | I5 (dg/min.) | I10 (dg/min.) | HLMI (dg/min) | MFR (I21.6/I10) | Density (g/cc) |
|---|---|---|---|---|---|---|---|
| 1 | 178.9 | 30.8 | 0.64 | 1.63 | 6.4 | 3.9 | 0.9419 |
| 2 | 199.2 | 32.7 | 0.56 | 1.84 | 5.3 | 2.9 | 0.9409 |
| 3 | 190.7 | 34.4 | 0.79 | 1.86 | 7.6 | 4.1 | 0.9545 |
| 4 | 181.9 | 33.2 | 0.59 | 2.36 | 13.0 | 5.5 | 0.9464 |
| 5 | 284.4 | 28.8 | 0.14 | 0.77 | 3.4 | 4.4 | 0.9431 |
| 6 | 172.2 | 31.7 | 0.87 | 2.63 | 12.1 | 4.6 | 0.9495 |
| 7 | 185.5 | 34.7 | 0.70 | 3.78 | 22.0 | 5.8 | 0.9491 |
| 8 | 271.5 | 33.4 | 0.14 | 0.61 | 5.4 | 8.8 | 0.9448 |
| 9 | 263.3 | 26.1 | 0.18 | 0.97 | 5.4 | 5.6 | 0.9453 |
| 10 | 256.5 | 29.0 | 0.18 | 1.33 | 11.3 | 8.5 | 0.9482 |
| 11 | 259.0 | 27.0 | 0.35 | 1.64 | 11.8 | 7.2 | 0.9479 |
| 12 | 242.1 | 29.8 | 0.27 | 1.20 | 10.7 | 8.9 | 0.9481 |
| 13 | 268.2 | 30.2 | 0.32 | 0.75 | 6.4 | 8.5 | 0.9493 |
| 14 | 270.1 | 31.1 | 0.25 | 0.92 | 6.0 | 6.5 | 0.9579 |
| 15 | 221.2 | 29.1 | 0.58 | 3.36 | 41.5 | 12.3 | 0.9513 |

The fifteen resins from Table 2 were formed into blown films using a 1.5" Davis-Standard blown film with a 2-inch die, 0.035 inch die gap, at an output rate of 29 lb/hr, a 4:1 blow up ratio (BUR), a 14 inch freeze line (neck) height an extrusion temperature profile of 205° C. to 210° C. across the extruder and die and 1.0 mil gauge. The thickness of the film may also be referred to as the film gauge. The properties of the film were evaluated and are presented in Table 3.

TABLE 3

| Sample ID | Dart (g) | Spencer Impact (J) | MD Tear (g) | TD Tear (g) | Haze % | Clarity % |
|---|---|---|---|---|---|---|
| 1 | 481 | 1.22 | 119 | 964 | 14.0 | 85.3 |
| 2 | 371 | 1.52 | 100 | 677 | 15.6 | 80.9 |
| 3 | 189 | 0.62 | 55 | 968 | 23.6 | 81.4 |
| 4 | 311 | 1.04 | 56 | 987 | 40.7 | 58.6 |
| 5 | 409 | 2.04 | 32 | 448 | 71.8 | 13.9 |
| 6 | NA | NA | NA | NA | 78.0 | 22.5 |
| 7 | 217 | 0.90 | 38 | 832 | 84.0 | 10.7 |
| 8 | 590 | 2.08 | 34 | 606 | 85.5 | 8.5 |
| 9 | 592 | 2.07 | 31 | 585 | 88.6 | 7.5 |
| 10 | 499 | 2.04 | 36 | 617 | 91.8 | 6.4 |
| 11 | 360 | 1.44 | 42 | 607 | 93.0 | 6.6 |
| 12 | NA | NA | NA | NA | 93.2 | 6.4 |
| 13 | 399 | 1.25 | 58 | 450 | 93.3 | 6.5 |
| 14 | 366 | 1.56 | 59 | 471 | 93.4 | 6.2 |
| 15 | 189 | 0.87 | 27 | 734 | 95.4 | 5.8 |

Figure 2:
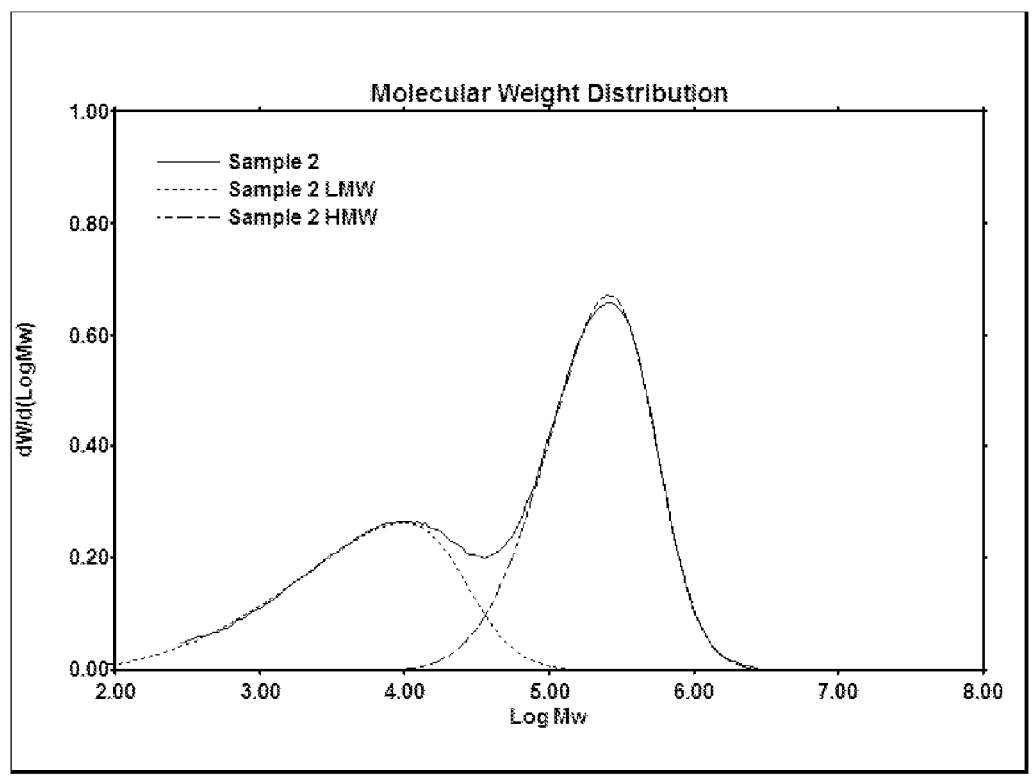
FIGS. 2 and 3 are deconvoluted size exclusion chromatographs of samples from example 1.
Figure 3:
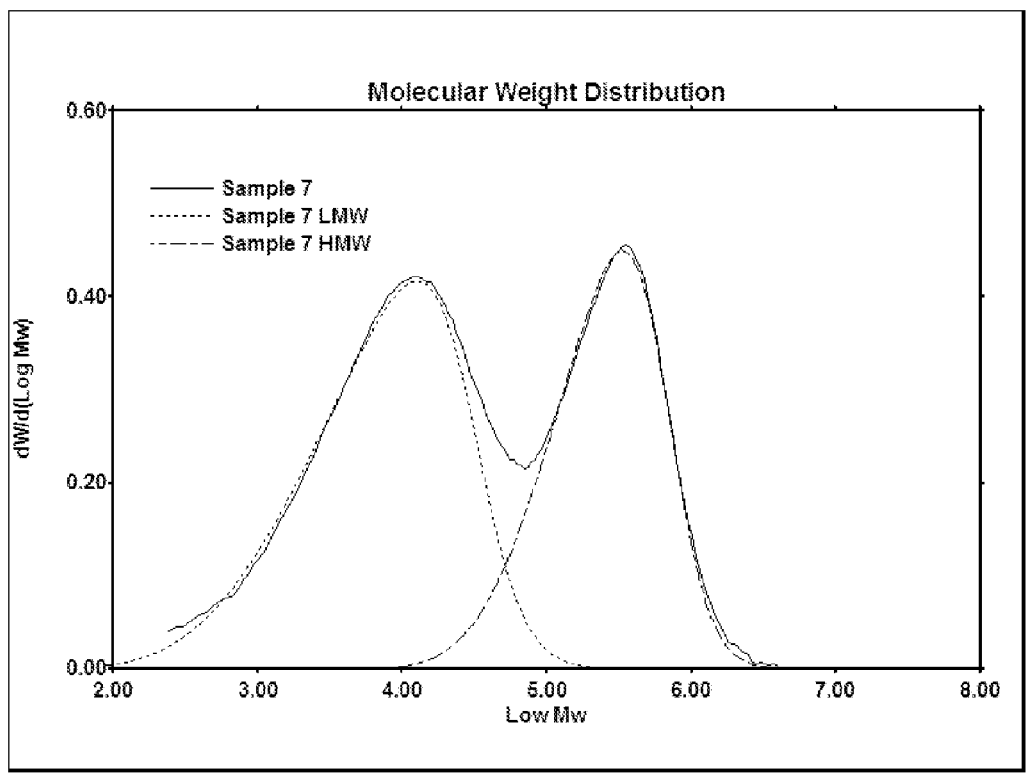

Comparison of size exclusion chromatography of a low haze example (sample 2) and a high haze example (sample 7) is shown in FIG. 1. Deconvolution of the SEC of samples 1-15 provided the fraction of LMW component present in each sample in the addition to the MWD of both the LMW and HMW components. This data is presented in Table 4 and shown in FIGS. 2 and 3.

TABLE 4

| ID Number | LMW Fraction | LMW MWD | HMW MWD |
|---|---|---|---|
| 1 | 0.34 | 5.20 | 2.35 |
| 2 | 0.39 | 8.25 | 2.09 |
| 3 | 0.39 | 6.42 | 2.55 |
| 4 | 0.45 | 5.13 | 2.40 |
| 5 | 0.50 | 4.59 | 2.00 |
| 6 | 0.56 | 5.89 | 2.35 |
| 7 | 0.56 | 5.89 | 2.33 |

TABLE 4-continued

| ID Number | LMW Fraction | LMW MWD | HMW MWD |
|---|---|---|---|
| 8 | 0.51 | 5.18 | 2.01 |
| 9 | 0.52 | 4.67 | 2.03 |
| 10 | 0.61 | 4.38 | 2.00 |
| 11 | 0.65 | 5.28 | 2.00 |
| 12 | 0.60 | 4.24 | 2.07 |
| 13 | 0.55 | 4.76 | 2.26 |
| 14 | 0.56 | 4.64 | 2.11 |
| 15 | 0.70 | 4.42 | 2.00 |

Figure 4:
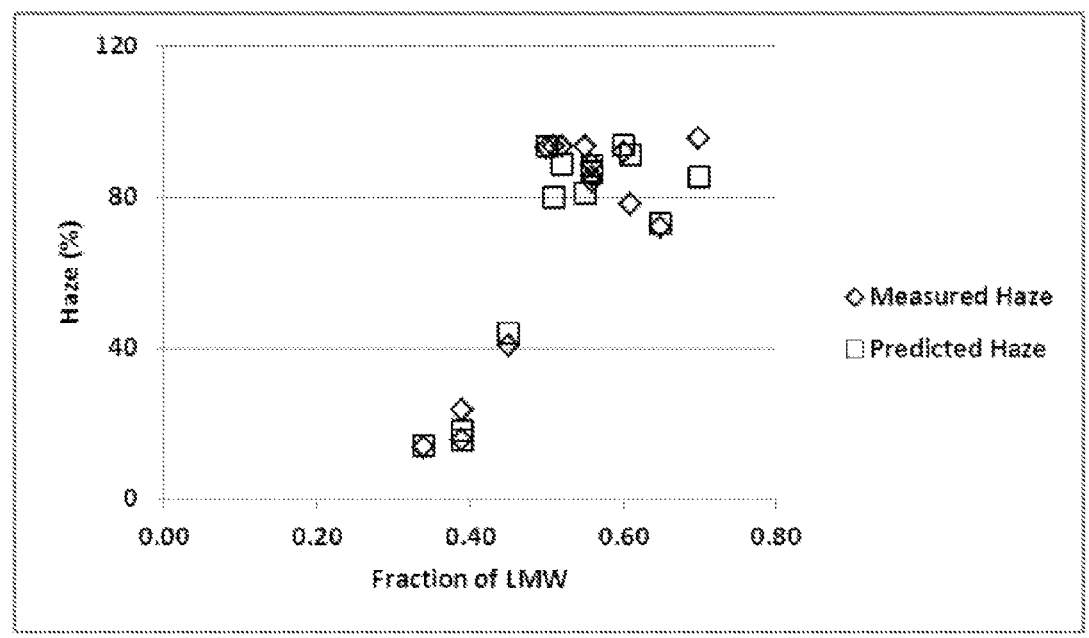
FIG. 4 is a plot of the measured haze as a function of the lower molecular weight fraction present for each sample from example 1.
Figure 5:
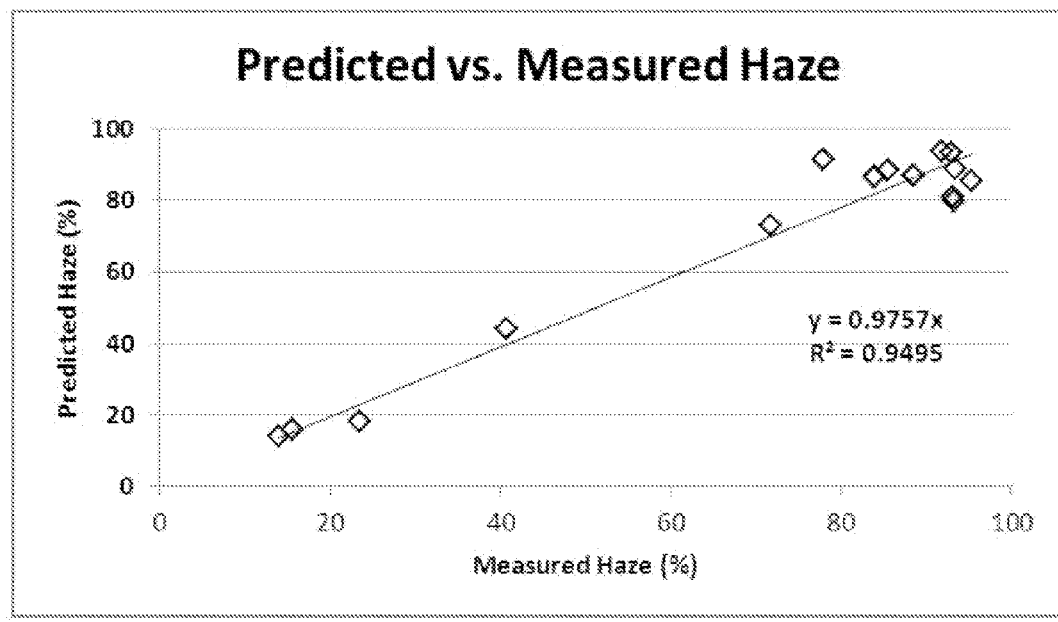
FIG. 5 is a plot of the predicted haze as a function of the measured haze for the samples from example 1.
Figure 6:
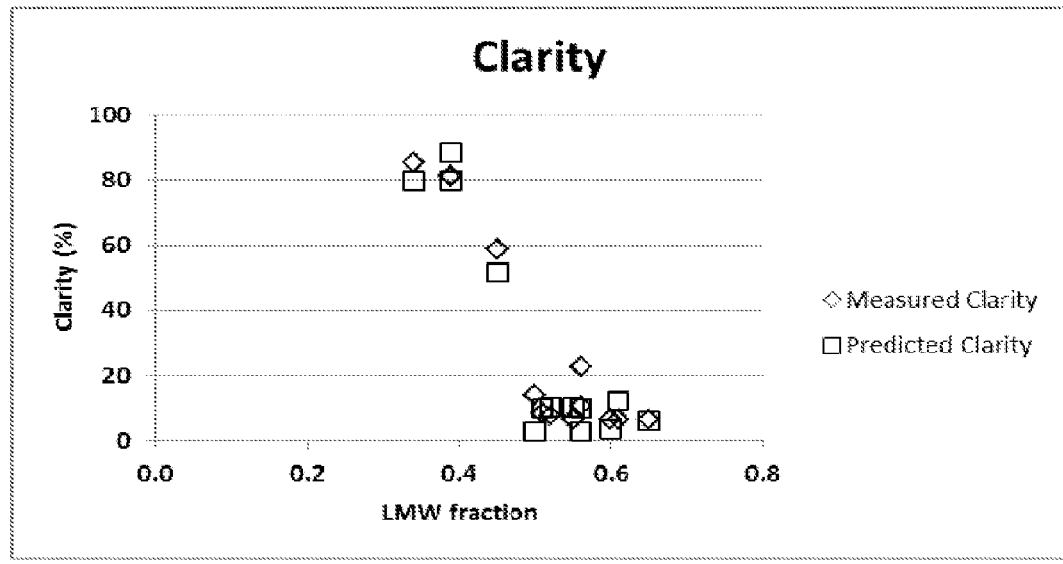
FIG. 6 is a plot of the measured clarity as a function of the lower molecular weight fraction present for each sample from example 1.
Figure 7:
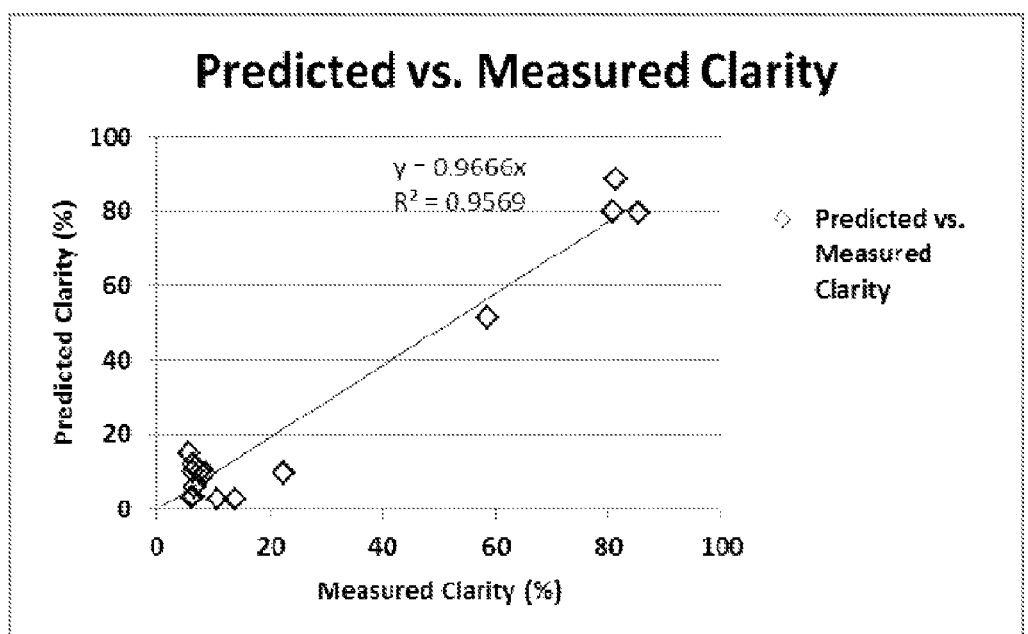
FIG. 7 is a plot of the predicted clarity as a function of the measured clarity for the samples from example 1.

The experimentally determined haze and clarity for samples 1-15 were compared to the haze and clarity determined using Equations 3 and 4 respectively. Table 5 presents the fraction of the LMW component, MWD of the LMW and HMW components and the measured and predicted haze. The data are plotted in FIGS. 4 and 5. Table 6 presents the weight fraction of the LMW component, MWD of the LMW and HMW components and the measured and predicted clarity. The data are plotted in FIGS. 6 and 7.

TABLE 5

| Sample ID | LMW Fraction | LMW MWD | HMW MWD | Haze Measured (%) | Haze Predicted (%) |
|---|---|---|---|---|---|
| 1 | 0.34 | 5.20 | 2.35 | 14.0 | 14.1 |
| 2 | 0.39 | 8.25 | 2.09 | 15.6 | 15.8 |
| 3 | 0.39 | 6.42 | 2.55 | 23.6 | 18.2 |
| 4 | 0.45 | 5.13 | 2.40 | 40.7 | 43.9 |
| 5 | 0.50 | 4.59 | 2.00 | 93.0 | 93.3 |
| 6 | 0.56 | 5.89 | 2.35 | 85.5 | 88.2 |
| 7 | 0.56 | 5.89 | 2.33 | 88.6 | 86.9 |
| 8 | 0.51 | 5.18 | 2.01 | 93.3 | 79.9 |
| 9 | 0.52 | 4.67 | 2.03 | 93.4 | 88.8 |
| 10 | 0.61 | 4.38 | 2.00 | 78.0 | 91.3 |
| 11 | 0.65 | 5.28 | 2.00 | 71.8 | 73.2 |
| 12 | 0.60 | 4.24 | 2.07 | 91.8 | 93.7 |
| 13 | 0.55 | 4.76 | 2.26 | 93.2 | 80.9 |
| 14 | 0.56 | 4.64 | 2.11 | 84.0 | 86.6 |
| 15 | 0.70 | 4.42 | 2.00 | 95.4 | 85.2 |

TABLE 6

| Sample | LMW fraction | LMW MWD | HMW MWD | Clarity (%) Measured | Clarity (%) Predicted |
|---|---|---|---|---|---|
| 1  | 0.34 | 5.2 | 2.4 | 85 | 80 |
| 2  | 0.39 | 8.3 | 2.1 | 81 | 80 |
| 3  | 0.39 | 6.4 | 2.6 | 81 | 88 |
| 4  | 0.45 | 5.1 | 2.4 | 59 | 51 |
| 5  | 0.50 | 4.6 | 2.0 | 14 | 3 |
| 6  | 0.56 | 5.9 | 2.4 | 23 | 10 |
| 7  | 0.56 | 5.9 | 2.3 | 11 | 3 |
| 8  | 0.51 | 5.2 | 2.0 | 9 | 10 |
| 9  | 0.52 | 4.7 | 2.0 | 8 | 10 |
| 10 | 0.61 | 4.4 | 2.0 | 6 | 12 |
| 11 | 0.65 | 5.3 | 2.0 | 7 | 6 |
| 12 | 0.60 | 4.2 | 2.1 | 6 | 3 |
| 13 | 0.55 | 4.8 | 2.3 | 6 | 10 |
| 14 | 0.56 | 4.6 | 2.1 | 6 | 3 |
| 15 | 0.70 | 4.4 | 2.0 | 6 | 15 |

The data demonstrate the medium to high density PE polymers with a characteristic bimodal architecture of this disclosure display the typical film properties of medium to high density HMW PE resins (e.g., dart and Elmendorf tear strength) but uncharacteristically display high clarity and low haze, generally associated with lower density materials.

ADDITIONAL DISCLOSURE

The following enumerated embodiments are provided as non-limiting examples.

A first embodiment which is a bimodal polymer having a weight fraction of a lower molecular weight (LMW) component ranging from about 0.25 to about 0.45, a weight fraction of a higher molecular weight (HMW) component ranging from about 0.55 to about 0.75 and a density of from about 0.931 g/cc to about 0.955 g/cc which when tested in accordance with ASTM D1003 using a 1 mil test specimen displays a haze characterized by equation: % Haze=2145−2216*Fraction$_{LMW}$−181*a molecular weight distribution of the LMW component (MWD$_{LMW}$)−932*a molecular weight distribution of the HMW component(MWD$_{HMW}$)+27*(Fraction$_{LMW}$*MWD$_{LMW}$)+1019*(Fraction$_{LMW}$*MWD$_{HMW}$)+73*(MWD$_{LMW}$*MWD$_{HMW}$) wherein fraction refers to the weight fraction of the component in the polymer as a whole.

A second embodiment which is the polymer of the first embodiment which when tested in accordance with ASTM D1746 displays a clarity characterized by equation: % Clarity=1934*Fraction$_{LMW}$+139*(MWD$_{LMW}$)+709*(MWD$_{HMW}$)−60*(Fraction$_{LMW}$*MWD$_{LMW}$)−819*(Fraction$_{LMW}$*MWD$_{HMW}$)−47*(MWD$_{LMW}$*MWD$_{HMW}$)−1632.

A third embodiment which is the polymer of any of the first through second embodiments having a molecular weight distribution of from about 20 to about 40.

A fourth embodiment which is the polymer of any of the first through third embodiments wherein the LMW component has a molecular weight distribution of from about 4.5 to about 10.

A fifth embodiment which is the polymer of any of the first through fourth embodiments wherein the HMW component has a molecular weight distribution of from about 2 to about 4.

A sixth embodiment which is the polymer of any of the first through fifth embodiments having a high load melt index of from about 5 dg/min. to about 15 dg/min.

A seventh embodiment which is the polymer of any of the first through sixth embodiments which when tested in accordance with ASTM D882 has a 1% secant modulus in the transverse direction of from about 100,000 psi to about 300,000 psi.

An eighth embodiment which is the polymer of any of the first through seventh embodiments which when tested in accordance with ASTM D882 has a 1% secant modulus in the machine direction of from about 90,000 psi to about 160,000 psi.

A ninth embodiment which is the polymer of any of the first through eighth embodiment which when tested in accordance with ASTM D1709 has a dart drop strength ranging from about 100 g to about 500 g.

A tenth embodiment which is the polymer of any of the first through ninth embodiments which when tested in accordance with ASTM D1922 has an Elmendorf tear strength in the machine direction ranging from about 40 g to about 150 g.

An eleventh embodiment which is the polymer of any of the first through tenth embodiments which when tested in accordance with ASTM D1922 has an Elmendorf tear strength in the transverse direction ranging from about 500 g to about 1200 g.

A twelfth embodiment which is the polymer of any of the first through eleventh embodiments which when tested in accordance with ASTM D3420 has Spencer impact of from about 0.5 J to about 1.8 J.

A thirteenth embodiment which is the polymer of any of the first through twelfth embodiments which when tested in accordance with ASTM D882 has a yield strength in the transverse direction ranging from about 3500 psi to 6500 psi.

A fourteenth embodiment which is the polymer of any of the first through thirteenth embodiments which when tested in accordance with ASTM D882 has a yield strength in the machine direction ranging from about 2500 psi to about 4500 psi.

A fifteenth embodiment which is the polymer of any of the first through fourteenth embodiments which when tested in accordance with ASTM D882 has a break strength in the transverse direction ranging from about 8000 psi to about 10000 psi.

A sixteenth embodiment which is the polymer of any of the first through fifteenth embodiments which when tested in accordance with ASTM D882 has a break strength in the machine direction ranging from about 9000 psi to about 12000 psi.

A seventeenth embodiment which is the polymer of any of the first through sixteenth embodiments which when tested in accordance with ASTM D882 has a break strain in the transverse direction ranging from about 500% to about 700%.

An eighteenth embodiment which is the polymer of any of the first through seventeenth embodiments which when tested in accordance with ASTM D882 has a break strain in the machine direction ranging from about 350% to about 450%.

A nineteenth embodiment which is the polymer of any of the first through eighteenth embodiments which when tested in accordance with ASTM D3985 has an oxygen transmission rate of from about 215 cc/100 in$^2$/day to about 140 cc/100 in$^2$/day.

A twentieth embodiments which is the polymer of any of the first through nineteenth embodiments which when tested in accordance with ASTM F1249 has a moisture vapor transmission rate of from about 0.6 g-mil/100 in$^2$/day to about 0.35 g-mil/100 in$^2$/day.

A twenty-first embodiment which is the polymer of any of the first through twentieth embodiments which when tested in accordance with ASTM D2457 has a gloss 60° of from about 20 to about 60.

A twenty-second embodiment which is the polymer of any of the first through twenty-first embodiments which when tested in accordance with ASTM D1003 has a percentage haze less than about 40%.

Without further elaboration, it is believed that one skilled in the art can, using the description herein, utilize the present invention to its fullest extent. While inventive aspects have been shown and described, modifications thereof can be made by one skilled in the art without departing from the spirit and teachings of the invention. The embodiments and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The disclosures of all patents, patent applications, and publications cited herein are hereby incorporated by reference, to the extent that they provide exemplary, procedural or other details supplementary to those set forth herein.

What is claimed is:

1. A bimodal polymer having a weight fraction of a lower molecular weight (LMW) component ranging from about 0.25 to about 0.45, a weight fraction of a higher molecular weight (HMW) component ranging from about 0.55 to about 0.75 and a density of from about 0.931 g/cc to about 0.955 g/cc which when tested in accordance with ASTM D1003 using a 1 mil test specimen displays a haze characterized by equation: % Haze=2145−2216*Fraction$_{LMW}$−181* a molecular weight distribution of the LMW component (MWD$_{LMW}$)−932* a molecular weight distribution of the HMW component(MWD$_{HMW}$)+27*(Fraction$_{LMW}$*MWD$_{LMW}$)+1019*(Fraction$_{LMW}$*MWD$_{HMW}$)+73*(MWD$_{LMW}$*MWD$_{HMW}$) wherein fraction refers to the weight fraction of the component in the polymer as a whole, wherein the bimodal polymer is produced by:

contacting a polymerization catalyst and monomer in the presence of hydrogen in one or more polymerization reactors to yield the bimodal polymer.

2. The bimodal polymer of claim 1, wherein the one or more polymerization reactors is selected from batch, slurry, gas-phase, solution, high pressure, tubular, autoclave, or combinations thereof.

3. The bimodal polymer of claim 1, wherein the one or more polymerization reactors comprises multiple loop reactors, multiple gas phase reactors, a combination of one or more loop reactors and one or more gas phase reactors, multiple high pressure reactors, or a high pressure reactor in combination with a loop reactor and/or a gas phase reactor.

4. The bimodal polymer of claim 1, wherein the polymerization catalyst comprises a dual metallocene catalyst system.

5. The bimodal polymer of claim 4, wherein the dual metallocene catalyst system comprises a tightly bridged metallocene compound having a substituent that includes a terminal olefin and an unbridged metallocene compound.

6. The bimodal polymer of claim 4, wherein the polymerization catalyst further comprises an activator.

7. The bimodal polymer of claim 6, wherein the activator comprises an organoaluminum compound.

8. The bimodal polymer of claim 4, wherein the one or more polymerization reactors comprises multiple loop reactors, multiple gas phase reactors, a combination of one or more loop reactors and one or more gas phase reactors, multiple high pressure reactors, or a high pressure reactor in combination with a loop reactor and/or a gas phase reactor.

9. The bimodal polymer of claim 1, wherein the polymerization catalyst is a polymerization catalyst system comprising:

a first catalyst composition which contacts the monomer in the presence of hydrogen in a first polymerization reactor of the one or more polymerization reactors under conditions sufficient to yield a first polymer product; and a second catalyst composition which contacts the monomer in the presence of hydrogen in a second polymerization reactor of the one or more polymerization reactors under conditions sufficient to yield a second polymer product;

wherein the first polymer product, the second polymer product, or both the first polymer product and the second polymer product is the bimodal polymer.

10. The bimodal polymer of claim 9, wherein the first catalyst composition comprises a tightly bridged metallocene compound having a substituent that includes a terminal olefin, wherein the second catalyst composition comprises an unbridged metallocene compound.

11. The bimodal polymer of claim 1, wherein the monomer is ethylene, and wherein the bimodal polymer is a polyethylene polymer.

12. A film formed from a bimodal polymer having a weight fraction of a lower molecular weight (LMW component ranging from about 0.25 to about 0.45, a weight fraction of a higher molecular weight (HMW) component ranging from about 0.55 to about 0.75 and a density of from about 0.931 g/cc to about 0.955 g/cc which when tested in accordance with ASTM D1003 using a 1 mil test specimen displays a haze characterized by equation: %Haze=2145−2216*Fraction$_{LMW}$−181* a molecular weight distribution of the LMW component (MWD$_{LMW}$)−932*a molecular weight distribution of the HMW component(MWD$_{HMW}$)+27*(Fraction$_{LMW}$*MWD$_{LMW}$)+1019*(Fraction$_{LMW}$*MWD$_{HMW}$)+73*(MWD$_{LMW}$*MWD$_{HMW}$) wherein fraction refers to the weight fraction of the component in the polymer as a whole.

13. The film of claim 12, comprising a polyethylene bimodal polymer.

14. An article formed from a bimodal polymer having a weight fraction of a lower molecular weight (LMW) component ranging from about 0.25 to about 0.45, a weight fraction of a higher molecular weight (HMW) component ranging from about 0.55 to about 0.75 and a density of from about 0.931 g/cc to about 0.955 g/cc which when tested in accordance with ASTM D1003 using a 1 mil test specimen displays a haze characterized by equation: %Haze=2145−2216*Frac- $tion_{LMW}$−181*a molecular weight distribution of the LMW component ($MWD_{LMW}$)−932*a molecular weight distribution of the HMW component($MWD_{HMW}$)+27*($Fraction_{LMW}$*$MWD_{LMW}$)+1019*($Fraction_{LMW}$*$MWD_{HMW}$)+73*($MWD_{LMW}$*$MWD_{HMW}$) wherein fraction refers to the weight fraction of the component in the polymer as a whole.

15. The article of claim 14, selected from a pipe, a bottle, a toy, a container, a utensil, a film product, a drum, a tank, a membrane, and a liner.

16. The article of claim 14, wherein the bimodal polymer is a polyethylene polymer.

17. A process for producing a bimodal polymer comprising:

contacting a polymerization catalyst and monomer in the presence of hydrogen in one or more polymerization reactors to yield the bimodal polymer, wherein the bimodal polymer has a weight fraction of a lower molecular weight (LMW) component ranging from about 0.25 to about 0.45 a weight fraction of a higher molecular weight (HMW) component ranging from about 0.55 to about 0.75 and a density of from about 0.931 g/cc to about 0.955 g/cc which when tested in accordance with ASTM D1003 using a 1 mil test specimen displays a haze characterized by equation: % Haze =2145−2216*$Fraction_{LMW}$−181*a molecular weight distribution of the LMW component ($MWD_{LMW}$)−932*a molecular weight distribution of the HMW component($MWD_{HMW}$)+27*($Fraction_{LMW}$*$MWD_{LMW}$)+1019*($Fraction_{LMW}$*$MWD_{HMW}$)+73*($MWD_{LMW}$*$MWD_{HMW}$) wherein fraction refers to the weight fraction of the component in the polymer as a whole.

* * * * *